United States Patent
Daum et al.

(10) Patent No.: US 8,348,246 B2
(45) Date of Patent: Jan. 8, 2013

(54) FLUID DISTRIBUTION SYSTEM

(75) Inventors: Karl-Heinz Daum, Mainz (DE); Wolf-Christoph Rauser, Frankfurt am Main (DE); Wolfram Schalk, Neu-Anspach (DE)

(73) Assignee: Outotec Oyj, Espoo (FI)

( * ) Notice: Subject to any disclaimer, the term of this patent is extended or adjusted under 35 U.S.C. 154(b) by 338 days.

(21) Appl. No.: 12/670,168

(22) PCT Filed: Jul. 11, 2008

(86) PCT No.: PCT/EP2008/005668
§ 371 (c)(1),
(2), (4) Date: Jan. 22, 2010

(87) PCT Pub. No.: WO2009/015753
PCT Pub. Date: Feb. 5, 2009

(65) Prior Publication Data
US 2010/0236636 A1    Sep. 23, 2010

(30) Foreign Application Priority Data
Jul. 27, 2007  (DE) .......................... 10 2007 035 639

(51) Int. Cl.
*B01F 3/04*        (2006.01)
(52) U.S. Cl. .......................... 261/97; 137/14
(58) Field of Classification Search ............... 261/97, 261/110; 137/14
See application file for complete search history.

(56) References Cited

U.S. PATENT DOCUMENTS

| 3,315,896 | A | * | 4/1967 | Jacir | ........................ 239/193 |
| 4,267,978 | A | * | 5/1981 | Manteufel | ........................ 239/193 |
| 4,729,857 | A | * | 3/1988 | Lee et al. | ........................ 261/97 |

(Continued)

FOREIGN PATENT DOCUMENTS
DE    1906962 A1    8/1970
(Continued)

OTHER PUBLICATIONS

An International Search Report, mailed on Oct. 31, 2008, which issued during the prosecution of corresponding International Patent Application No. PCT/EP2008/005668; 3 pages.

*Primary Examiner* — Charles Bushey
(74) *Attorney, Agent, or Firm* — Leydig, Voit & Mayer, Ltd.

(57) ABSTRACT

A system for distributing a fluid via a packing disposed in a container, the packing configured to have the fluid trickle from a top to a bottom thereof, includes at least one distributor member including a pressure conduit having at least one nozzle configured to discharge the fluid therethrough and a distributor channel adjoining the distributor member. A width of the distributor channel does not substantially exceed a diameter of the distributor member. The distributor channel defines at least one outlet slot disposed at a lower end of the distributor channel. The at least one outlet slot has a specified width and is configured to discharge the fluid from the distributor channel to the packing via a guide member. The distributor channel is configured to receive the fluid discharged from the at least one nozzle so as to provide a specified level of the fluid in the distributor channel. The distributor channel forms a ventable chamber above the specified fluid level. The ventable chamber is configured to maintain a pressure corresponding to a pressure in the container in which the packing is disposed.

20 Claims, 1 Drawing Sheet

U.S. PATENT DOCUMENTS

| | | | |
|---|---|---|---|
| 4,816,191 A * | 3/1989 | Berven et al. | 261/97 |
| 4,855,089 A | 8/1989 | Michels | |
| 5,160,510 A * | 11/1992 | Steinbacher et al. | 95/64 |
| 5,439,620 A | 8/1995 | Maeda | |
| 5,906,773 A | 5/1999 | Hausch et al. | |
| 6,540,213 B2 * | 4/2003 | Bachmann et al. | 261/97 |
| 6,575,437 B2 | 6/2003 | Fischer et al. | |
| 6,722,639 B2 * | 4/2004 | Ender et al. | 261/97 |
| 7,125,004 B2 * | 10/2006 | Dollie et al. | 261/97 |
| 7,712,728 B2 * | 5/2010 | Kehrer | 261/97 |
| 7,763,101 B2 * | 7/2010 | Maekawa et al. | 96/44 |
| 2001/0028121 A1 | 10/2001 | Richardson | |
| 2002/0158350 A1 | 10/2002 | Ender et al. | |
| 2004/0182013 A1 | 9/2004 | Kehrer | |
| 2005/0035473 A1 | 2/2005 | Manteufel | |
| 2005/0189663 A1 * | 9/2005 | Dollie et al. | 261/97 |

FOREIGN PATENT DOCUMENTS

| | | |
|---|---|---|
| EP | 1323467 A1 | 7/2003 |
| WO | 01/89655 A1 | 11/2001 |
| WO | 02/083260 A2 | 10/2002 |

* cited by examiner

FLUID DISTRIBUTION SYSTEM

CROSS REFERENCE TO PRIOR APPLICATIONS

This application is a U.S. National Phase application under 35 U.S.C. §371 of International Application No. PCT/EP2008/005668, filed on Jul. 11, 2008 and which claims benefit to German Patent Application No. 10 2007 035 639.2, filed on Jul. 27, 2007. The International Application was published in English on Feb. 5, 2009 as WO 2009/015753 A1 under PCT Article 21(2).

FIELD

This present invention relates to a system for distributing a fluid, such as, for example, organic solvents, water, aqueous salt solution, lyes or acids, via random or structured packing, in which the fluid trickles from the top to the bottom, for example, in countercurrent or cocurrent flow with a gas containing, for example, $SO_3$ or noxious substances, comprising at least one distribution device, from which the fluid is introduced via openings into a distributor channel such that below the openings a specified fluid level is obtained in the distributor channel, wherein the fluid is discharged from the distributor channel via at least one outlet slot of specified width at the lower end of the distributor channel to the packed bed by means of a guiding device.

BACKGROUND

In a known tube type irrigation system, a plurality of tubes with many bores directed upwards at an angle, through which the acid is discharged radially, extend from a main distributor tube. By means of baffle plates attached to the tubes these jets are directed downwards into the packed bed.

Such systems are used, for instance, for the countercurrent absorption of $SO_3$ or water vapor in sulfuric acid in a packed tower. In the head of an, for example, cylindrical container, the absorber acid is uniformly distributed over the apparatus cross-section by means of an irrigation system and trickles through a packed bed from the top to the bottom. From the gas countercurrently flowing to the top, the trickling acid absorbs the $SO_3$, with the acid concentration rising correspondingly, or water, whereby the acid is diluted. In standard configurations, the absorber constitutes a packed tower constructed as a counterflow apparatus, whose shell is divided into three zones: the lower part is formed by the sump with the acid outlet, the middle part contains, for instance, the packed bed on a support grid through which the acid, which is uniformly distributed by an irrigation system located on top of the bed, trickles downwards. The acid inlet to the irrigation system and the gas outlet are located above the packed bed. Known issues of such systems are the reduced gas outlet area, which leads to an undesired local increase in the gas velocity and, hence, promotes the entrainment of acid droplets or mists.

US 2004/0182013 A1 describes a distributor system in which the fluid is discharged pressureless from a plurality of openings in the side wall of a distributor trough open at the top and is guided to a lower dripping edge by means of a laterally downwardly curved mesh structure, wherein the mesh structure is passed through a distributor channel forming a throttle. This device on the one hand involves the problem of the entrainment of fine acid droplets and mists, and on the other hand the individual distributor members consisting of distributor trough and mesh structure have an undesirably high space requirement, which leads to a reduction of the area available for the gas flow.

U.S. Pat. No. 5,906,773 A describes a liquid distributor system in which the liquid is guided from a distributor trough which in a wall includes two openings arranged one above the other at a distance and leading into a vertical guiding tube, onto an inclined baffle surface 5 on which a weir is formed which should promote the further distribution of the liquid. The liquid then flows via a vertical guiding plate 7 onto the surface of the filler packing. Apart from the space requirement of these distributor members, there is also the problem of the entrainment of liquid droplets or mists.

A similar configuration of a counterflow column is described in U.S. Pat. No. 6,575,437 B2, in which the liquid is passed onto the packing as a film and without pressure via a baffle plate arranged laterally with respect to a distributor trough.

U.S. Pat. No. 5,439,620 A describes distributor tubes in which liquid emerges from openings in the upper surface thereof and flows via guiding surfaces provided laterally at the distributor tubes, which have a serrated dripping edge, up to the surface of the packing. The desired uniform distribution of the liquid alone the length of the distributor tubes is not positively ensured. Another issue here is the exact control of the pressure to avoid splashing of liquid from the opening.

SUMMARY

An aspect of the present invention is to provide a rather uniform distribution of the fluid over the packing cross-section with little constructional effort, while reducing the amount of fluid droplets or mist entrained with the gas flow.

In an embodiment, the present invention provides a system for distributing a fluid via a packing disposed in a container, the packing configured to have the fluid trickle from a top to a bottom thereof. The system includes at least one distributor member including a pressure conduit having at least one nozzle configured to discharge the fluid therethrough and a distributor channel adjoining the distributor member. A width of the distributor channel does not substantially exceed a diameter of the distributor member. The distributor channel defines at least one outlet slot disposed at a lower end of the distributor channel. The at least one outlet slot has a specified width and is configured to discharge the fluid from the distributor channel to the packing via a guide member. The distributor channel is configured to receive the fluid discharged from the at least one nozzle so as to provide a specified level of the fluid in the distributor channel. The distributor channel forms a ventable chamber above the specified fluid level. The ventable chamber is configured to maintain a pressure corresponding to a pressure in the container in which the packing is disposed.

BRIEF DESCRIPTION OF THE DRAWINGS

The present invention is described in greater detail below on the basis of embodiments and of the drawings in which.

DETAILED DESCRIPTION

Figure 1:
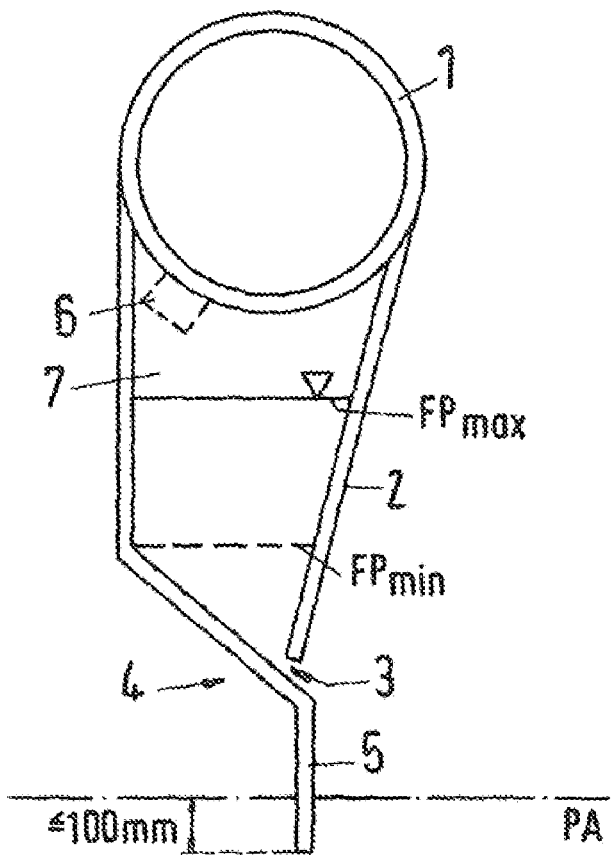
FIG. 1 schematically shows by way of example a vertical section of a fluid distributor arranged above a filler packing, which consists of a distributor member, distributor channel and guide member, a plurality of which can be arranged at a distance from and parallel to each other for forming an entire sprinkling system in accordance with the present invention.

In this way, it is achieved that fluid droplets or mists produced when the fluid emerges from the nozzles are trapped in the substantially closed distributor channel and do not get into the gas phase. As a result, the flow velocity of the gas can be increased and the diameter of the tower can therefore be reduced, which leads to a saving of costs. A nonuniform discharge of the fluid from the nozzles is compensated by the fluid level formed in the distributor channel and by the guide member adjoining thereto along the entire length of the distributor member. As a result, a uniform controlled fluid film is guided onto the packing.

In an embodiment of the present invention, the distributor channel downwardly adjoins the distributor element and its width does not significantly exceed the diameter of the distributor element. In this way, the free area at the fluid inlet of the filler packing is maximized for the passage of the countercurrently flowing gas. The specific acid inlet in proportion to the filler packing per m$^2$ is up to 10 times, for example, 2 to 3 times as high compared to other sprinkling systems.

The nozzles of the distributor member can downwardly open into the distributor channel at an angle above the fluid level, so that the fluid jets impinge on a side wall of the distributor channel. This promotes a more uniform supply of fluid along the length of the distributor channel.

To furthermore prevent the generation of undesired fluid particles or mists, the guide member, which, for example, can constitute a guide plate, can extend into the filler packing, for example, down to a depth of about 100 mm.

For the uniform distribution of fluid by avoiding an undesired transfer of acid particles to the gas flow, it is advantageous when the fluid level in the distributor channel is maintained between about 10 and 100 mm, for example, between about 15 and 80 mm, above the outlet slot.

The width of the outlet slot of the distributor channel, for example, lies between about 3 and 20 mm, such as between about 5 and 15 mm.

The distributor element used, a plurality of which can be arranged at a distance from each other above the filler packing, can have a diameter between about 30 and 300 mm, for example, between about 50 and 250 mm.

In practice, the operating conditions can be chosen such that an excess pressure between about 0.2 and 6 bar, for example, between about 0.5 and 1 bar, exists in the distributor element.

In an embodiment of the present invention, a venting device can be provided in the chamber of the distributor channel in order to avoid an undesired increase in pressure and splashing of fluid out of the outlet slot.

It can also be advantageous when the distributor channel is downwardly tapered.

The system of the present invention can, for example, be used in a reactor in which fluid trickles over a packing.

The fluid distributor shown in the drawing includes a distributor member 1 constituting a tubular pressure conduit, which can, for example, be arranged parallel to the surface of a packing PA. The distributor member 1 should be supplied with the fluid to be distributed over the packing PA such that an excess pressure of between about 0.2 and 6 bar, for example, between about 0.4 and 4 bar, exists in the same.

Without an increase in cross-section, a distributor channel 2 adjoins the distributor member 1 in downward direction. At its lower, tapered end 4, the distributor channel 2 has an outlet gap 3 substantially extending along its entire length for the fluid accumulating in the distributor channel 2 up to a level FP, which by means of nozzles 6 distributed along the length of the distributor member 1 is sprayed into a closed chamber 7 formed above the fluid level FP and defined by the same and by the walls of the distributor channel and of the distributor member. The system is operated such that the fluid level FP is maintained between a maximum value $FP_{max}$ (for example, about 100 mm) and a minimum value $FP_{min}$ (for example, about 20 mm).

The nozzles 6 are disposed at an angle so that the jet of fluid first impinges on a side wall of the distributor channel 2. Fluid droplets or mists formed cannot be transferred to the counterflow gas, but are trapped at the fluid level and hence inside the chamber 7. In the Figure, one direction of the nozzles is shown by way of example; the nozzles can of course also be directed to the other side wall. An alternating nozzle position or dual nozzles in different directions are also possible. Likewise, the nozzles need not be arranged radially, but can be arranged tangentially or point in other directions.

In the chamber 7, a pressure is maintained which approximately corresponds to the pressure in the packed tower. By means of the constructive configuration and the pressure conditions it can be ensured that a uniform fluid film emerges from the outlet gap 3 and an undesired flooding of the filler packing PA is avoided. With its lower end, the plate-shaped guide member 5 adjoining below the outlet gap 3 reaches into the filler packing PA down to about 100 mm, for example, so that an undesired formation of fluid droplets or mists is also avoided at this point.

In practical operation, the fluid level FP can, for example, lie between about 10 and 100 mm, for example, between about 20 and 70 mm, the width of the outlet gap 3 can lie between about 3 and 20 mm, for example, between about 8 and 10 mm, and the diameter of the distributor member 1 can lie between about 30 and 300 mm, for example, between about 50 and 250 mm.

To maintain the desired pressure in the chamber 7, the chamber can be equipped with a venting device and, for example, with an overflow conduit so that no pressure can build up when too much fluid is supplied.

The chamber or its side walls can be configured differently from FIG. 1 without leaving the actual idea of the present invention, namely discharge of a rather undisturbed fluid flow from the chamber and passing the rather compact fluid flow onto the fillers.

The walls can have a symmetrical, tapered, straight or special shape. Likewise, the guide member 5 need not protrude vertically into the packing plane but can also be angled. It is also possible to use not one but a plurality of outlet gaps and in particular also a plurality of guide members which point in different directions.

The outlet gap likewise need not be inclined but can be open directly downwards or laterally.

Figure 2:
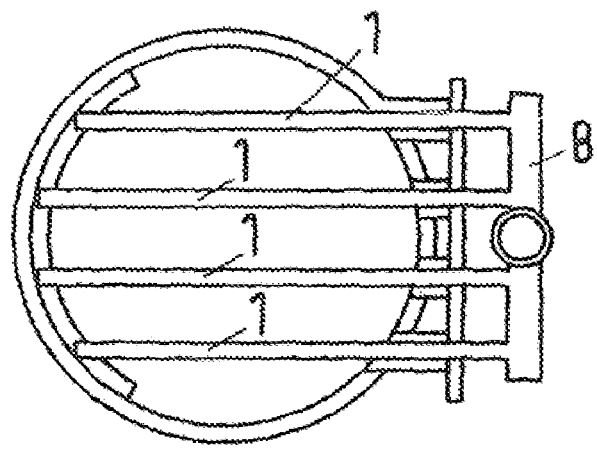
FIG. 2 schematically shows a top view of a packed tower with the fluid distributor in accordance with the present invention.

As shown in FIG. 2 by way of example, a plurality of, here four, distributor members 1 are provided one beside the other above the packing PA in order to uniformly distribute the fluid over the entire tower cross-section. The distributor members 1 are supplied with sulfuric acid via a common supply conduit 8.

In an embodiment of the present invention, the nozzles 6 can have no uniform diameter or shape, but different diameters in dependence on the distance from the supply conduit.

The present invention is not limited to embodiments described herein; reference should be had to the appended claims.

LIST OF REFERENCE NUMERALS

1 distributor member
2 distributor channel
3 outlet gap
4 tapered end
5 guide member 6 nozzles
7 chamber
8 supply conduit
FP fluid level
PA packing

The invention claimed is:

1. A system for distributing a fluid via a packing disposed in a container, the packing configured to have the fluid trickle from a top to a bottom thereof, the system comprising:
    at least one distributor member including a pressure conduit having at least one nozzle configured to discharge the fluid therethrough; and
    a distributor channel adjoining the distributor member from below with a width of the distributor channel that does not substantially exceed a diameter of the distributor member such that an overall width of the system, measured in a direction of the diameter of the distributor member, is not substantially enlarged by the width of the distributor channel, the distributor channel defining at least one outlet slot disposed at a lower end of the distributor channel, the at least one outlet slot having a specified width and being configured to discharge the fluid from the distributor channel to the packing via a guide member, the distributor channel being configured to receive the fluid discharged from the at least one nozzle so as to provide a specified level of the fluid in the distributor channel, the distributor channel forming a closed, but ventable chamber above the specified fluid level, the veritable chamber being configured to maintain a pressure corresponding to a pressure in the container in which the packing is disposed.

2. The system as recited in claim 1, wherein the packing includes at least one of a filler packing and a structured packing.

3. The system as recited in claim 1, wherein the at least one nozzle downwardly opens into the distributor channel at an angle above the fluid level.

4. The system as recited in claim 1, wherein the guide member protrudes into the packing.

5. The system as recited in claim 4, wherein the guide member protrudes into the packing down to about 100 mm.

6. The system as recited in claim 4, wherein the guide member includes a guide plate.

7. The system as recited in claim 6, wherein the guide member extends along an entire length of the distributor channel.

8. The system as recited in claim 1, wherein the specified fluid level in the distributor channel lies between about 10 and 100 mm above the outlet slot.

9. The system as recited in claim 1, wherein the specified width of the outlet slot is between about 3 and 20 mm.

10. The system as recited in claim 1, wherein the distributor member has a diameter between about 30 and 300 mm.

11. The system as recited in claim 10, wherein the distributor member has a diameter between about 50 and 250 mm.

12. The system as recited in claim 10, wherein the distributor member is tubular.

13. The system as recited in claim 1, further comprising a venting device disposed in the venting chamber.

14. The system as recited in claim 1, wherein the distributor channel is downwardly tapered.

15. A method for distributing fluid, the method comprising:
    providing a reactor;
    providing in the reactor a system for distributing a fluid via a packing, the system comprising:
        at least one distributor member including a pressure conduit having at least one nozzle configured to discharge the fluid therethrough; and
        a distributor channel adjoining the distributor member from below with a width of the distributor channel that does not substantially exceed a diameter of the distributor member such that an overall width of the system measured in a direction of the diameter of the distributor member, is not substantially enlarged by the width of the distributor channel, the distributor channel defining at least one outlet slot disposed at a lower end of the distributor channel, the at least one outlet slot having a specified width and being configured to discharge the fluid from the distributor channel to the packing via a guide member, the distributor channel being configured to receive the fluid discharged from the at least one nozzle so as to provide a specified level of the fluid in the distributor channel, the distributor channel forming a closed, but ventable chamber above the specified fluid level, the veritable chamber being configured to maintain a pressure corresponding to a pressure in the container in which the packing is disposed; and
    introducing the fluid into the system so that the fluid trickles over the packing from a top to a bottom of the packing.

16. The method as recited in claim 15, wherein the fluid includes at least one of an organic solvent, water, an aqueous salt solution, a lye and an acid.

17. The method as recited in claim 15, wherein the fluid trickles from the top to the bottom of the packing in countercurrent or cocurrent flow with a gas.

18. The method as recited in claim 17, wherein the gas includes at least one of $SO_3$ and a noxious substance.

19. The method as recited in claim 15, further comprising providing an excess pressure between about 0.2 and 6 bar in the distributor member during operation of the system.

20. The method as recited in claim 19, wherein the excess pressure is between about 0.5 and 1 bar.

* * * * *